US007974440B2

(12) United States Patent
Itoh

(10) Patent No.: US 7,974,440 B2
(45) Date of Patent: Jul. 5, 2011

(54) USE OF STATISTICAL DATA IN ESTIMATING AN APPEARING-OBJECT

(75) Inventor: Naoto Itoh, Saitama (JP)

(73) Assignee: Pioneer Corporation, Tokyo (JP)

( * ) Notice: Subject to any disclaimer, the term of this patent is extended or adjusted under 35 U.S.C. 154(b) by 1064 days.

(21) Appl. No.: 11/662,344

(22) PCT Filed: Sep. 7, 2005

(86) PCT No.: PCT/JP2005/016395

§ 371 (c)(1), (2), (4) Date: Jun. 4, 2007

(87) PCT Pub. No.: WO2006/028116

PCT Pub. Date: Mar. 16, 2006

(65) Prior Publication Data

US 2008/0002064 A1 Jan. 3, 2008

(30) Foreign Application Priority Data

Sep. 9, 2004 (JP) ................................ 2004-262154

(51) Int. Cl.
*G06K 9/00* (2006.01)

(52) U.S. Cl. ........................................ 382/103; 382/228

(58) Field of Classification Search .................. 382/103, 382/118, 224, 228, 286; 348/77, 169; 707/736, 707/741, 748, 749, 751
See application file for complete search history.

(56) References Cited

U.S. PATENT DOCUMENTS

| | | | | |
|---|---|---|---|---|
| 6,754,389 | B1 | 6/2004 | Dimitrova et al. | 382/244 |
| 2001/0051516 | A1 | 12/2001 | Nakamura et al. | 455/412 |
| 2002/0028021 | A1 * | 3/2002 | Foote et al. | 382/224 |
| 2005/0197923 | A1 * | 9/2005 | Kilner et al. | 705/27 |
| 2006/0257003 | A1 * | 11/2006 | Adelbert | 382/103 |

FOREIGN PATENT DOCUMENTS

| | | | |
|---|---|---|---|
| JP | 2002-51300 | A | 2/2002 |
| JP | 2002-262224 | A | 9/2002 |
| JP | 2003-529136 | A | 9/2003 |

* cited by examiner

*Primary Examiner* — Andrew W Johns
(74) *Attorney, Agent, or Firm* — Young & Thompson

(57) ABSTRACT

A person estimation device (10) includes an identification unit (200) for identifying a person in video. A person displayed in a smaller display area than the area defined by an identification enabled frame of the identification unit (200) is estimated by a CPU (110) in combination with the person identification by the identification unit (200). Here, statistic data concerning the person or the relationship between the persons is acquired from the statistic DB (20) and given as an estimation element. The person is estimated according to the estimation element.

13 Claims, 5 Drawing Sheets

[FIG. 1]
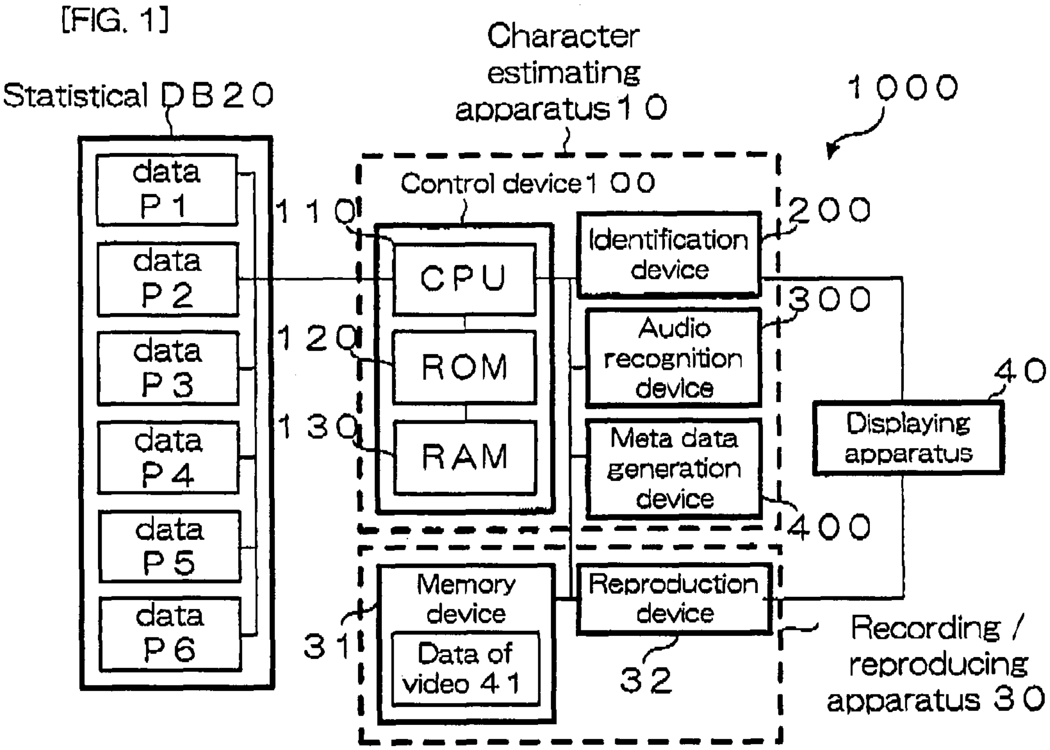
[FIG. 2]
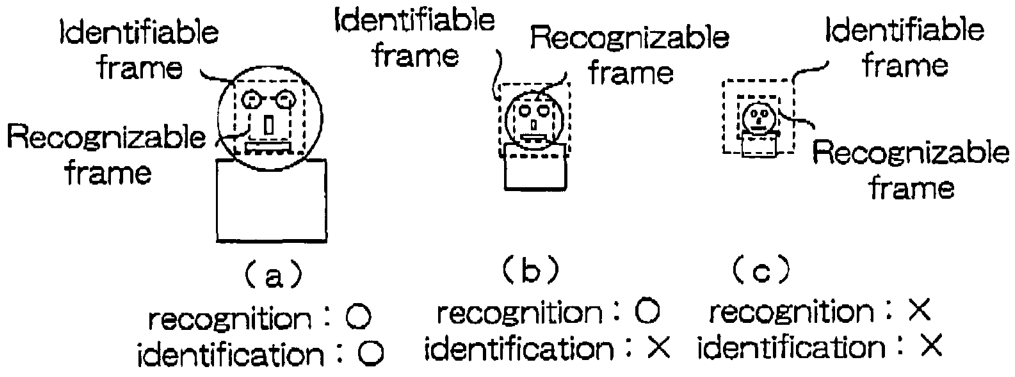

[FIG. 3]
Correlation table 2 1
m →
n ↓
| | H01 | H02 | H03 | ........ | H13 |
|---|---|---|---|---|---|
| H01 | I01 | R02,01 | R03,01 | ........ | R13,01 |
| H02 | R01,02 | I02 | R03,02 | ........ | R13,02 |
| H03 | R01,03 | R02,03 | I03 | ........ | R13,03 |
| : | : | : | : | | : |
| H13 | R01,13 | R02,13 | R03,13 | ........ | I13 |
[FIG. 4]
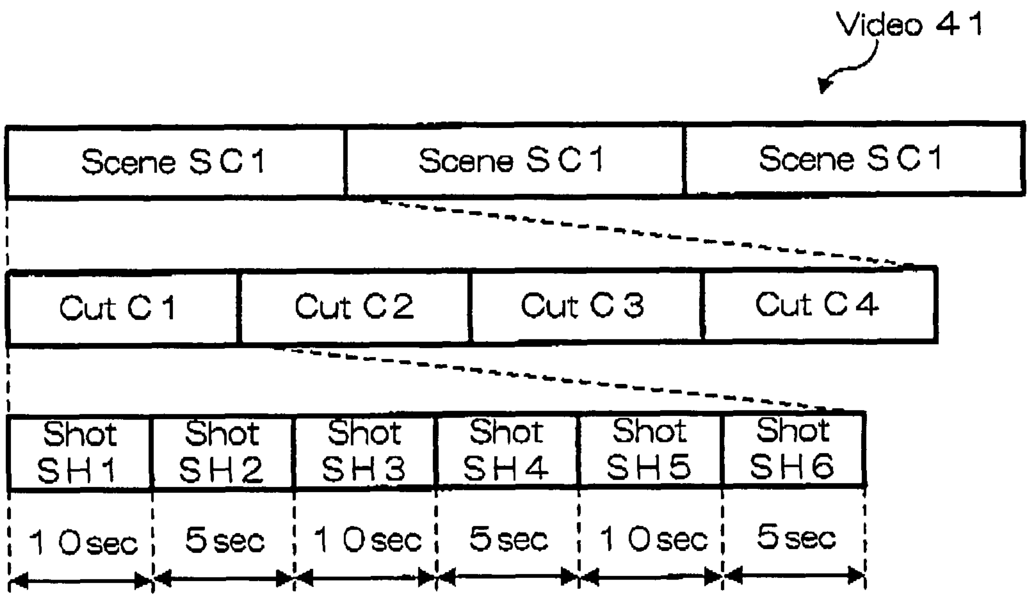

[FIG. 5]

| | Cut C1 → | | |
|---|---|---|---|
| | Shot SH1 | Shot SH2 | Shot SH3 |
| Time | 01:00:00 | 01:00:10 | 01:00:15 |
| Video | 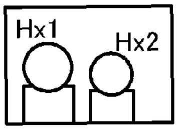 | 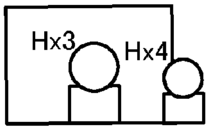 | 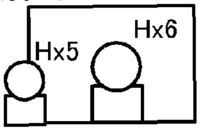 |
| Fact | Hx1=H01<br>Hx2=H02 | Hx3=H01<br>Hx4=H02 | Hx5=H01<br>Hx6=H02 |
| Identification result | Hx1=H01<br>Hx2=H02 | Hx3=H01 | Hx6=H02 |
| Estimation factor | | P6(C=1\|S2)>0.7<br>P4(H02\|H01)>0.7<br>P5(S=2\|H02,H01)>0.7 | P6(C=2\|S3)>0.6<br>P4(H01\|H02)>0.7<br>P5(S=3\|H02,H01)>0.7 |
| Final meta data | H01,H02 | H01,H02 | H01,H02 |
| Meta data (comparison ex.) | H01,H02 | H01 | H02 |

| | Cut C1 → | | |
|---|---|---|---|
| | Shot SH4 | Shot SH5 | Shot SH6 |
| Time | 01:00:25 | 01:00:30 | 01:00:40 |
| Video | 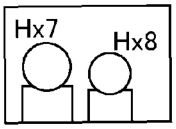 | 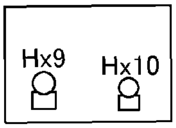 | 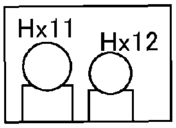 |
| Fact | Hx7=H01<br>Hx8=H02 | Hx9=H01<br>Hx10=H02 | Hx11=H01<br>Hx12=H02 |
| Identification result | Hx7=H01<br>Hx8=H02 | Hx9=???<br>Hx10=??? | Hx11=H01<br>Hx12=H02 |
| Estimation factor | | P6(C=4\|S5)>0.5<br>P4(H01\|H02)>0.7<br>P4(H02\|H01)>0.7<br>P5(S=5\|H01,H02)>0.7 | |
| Estimation factor | H01,H02 | H01,H02 | H01,H02 |
| Meta data (comparison ex.) | H01,H02 | Unknown two people | H01,H02 |

[FIG. 6]

| | | | |
|---|---|---|---|
| | Cut C1 → | | |
| | Shot SH1 | Shot SH2 | Shot SH3 |
| Time | 01:00:00 | 01:00:10 | 01:00:15 |
| Video | 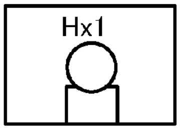  | 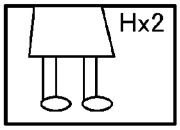  | 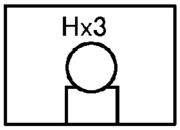  |
| Fact | Hx1=H01 | Hx2=H01 | Hx3=H01 |
| Identification result | Hx1=H01 | | Hx3=H01 |
| Estimation factor | | P6(C=1\|S2)>0.7<br>P1(H01)>0.7<br>P2(S=2\|H01)>0.7 | |
| Final meta data | H01 | H01 | H01 |
| Meta data (comparison ex.) | H01 | Character absent | H01 |

| | | | |
|---|---|---|---|
| | Cut C1 → | | |
| | Shot SH4 | Shot SH5 | Shot SH6 |
| Time | 01:00:25 | 01:00:30 | 01:00:40 |
| Video | 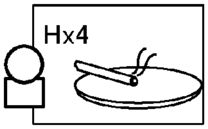  | 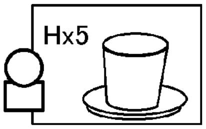  | 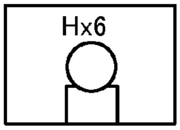  |
| Fact | Hx4=H01 | Hx5=H01 | Hx6=H01 |
| Identification result | | | Hx6=H01 |
| Estimation factor | P6(C=1\|S2)>0.7<br>P1(H01)>0.7<br>P2(S=2\|H01)>0.7 | P6(C=2\|S5)>0.5<br>P1(H01)>0.7<br>P2(S=3\|H01)>0.7 | |
| Final meta data | H01 | H01 | H01 |
| Meta data (comparison ex.) | Character absent | Character absent | H01 |

[FIG. 7]
| | |
|---|---|
| | Cut C1 |
| | Shot SH1 |
| Time<br>Video | 01:00:00<br>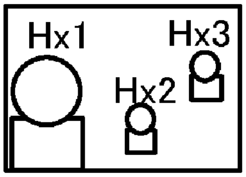 |
| Fact | Hx1=H01<br>Hx2=H02<br>Hx3=H03 |
| Identification result | Hx1=H01 |
| Estimation factor | P4(H02,H03\|H01)>0.7<br>P3(2\|H01)>0.3 |
| Final meta data | H01,H02,H03 |
| Meta data (comparison ex.) | H01 |

USE OF STATISTICAL DATA IN ESTIMATING AN APPEARING-OBJECT

TECHNICAL FIELD

The present invention relates to an appearing-object estimating apparatus and method, and a computer program.

BACKGROUND ART

For example, there is suggested an apparatus for reproducing only a desired scene when a picture program, such as a drama and a movie, is recorded to watch (e.g. refer to a patent document 1).

According to an index distribution apparatus, disclosed in the patent document 1 (hereinafter referred to as a "conventional technology"), when a recording apparatus records a broadcast program, a scene index, which is information indicating the generation time and content of each of the scenes that appear in the program, is simultaneously generated and distributed to the recording apparatus. It is considered that a user of the recording apparatus can selectively reproduce only the desired scene from the recorded program, on the basis of the distributed scene index.

Patent document 1: Japanese Patent Application Laid Open NO. 2002-262224

DISCLOSURE OF INVENTION

Subject to be Solved by the Invention

The conventional technology, however, has the following problems.

In the conventional technology, a staff or clerk inputs appropriate scene indexes to a scene index distributing apparatus while watching a broadcast program, to thereby generate the scene index. Namely, the conventional technology requires the input of the scene indexes by the staff in each broadcast program, which causes a physically, mentally, and economically huge load, so that it has such a technical problem that it is extremely unrealistic.

Moreover, in order to reduce such a huge load, there is a method of distinguishing a human's face from the geometric features of a video by using a face-recognition technology or the like, and identifying appearing characters or personae or the like, to thereby automatically record the content of the video. However, in this face-recognition technology, its identification accuracy is remarkably low; for example, a person displayed in profile cannot be identified. Thus, there is a difficulty in practically identifying the characters in the video.

Moreover, if the characters are not seen but only heard in the video, it can be said that it is remarkably difficult to identifier the characters even in case of a series of story.

It is therefore an object of the present invention to provide: an appearing-object estimating apparatus and method which enable an improved identification accuracy of identifying objects appearing in a video, and a computer program.

Means for Solving the Subject

<Appearing-Object Estimating Apparatus>

The above object of the present invention can be achieved by an appearing-object estimating apparatus for estimating an appearing-object or objects appearing in a recorded video, the appearing-object estimating apparatus provided with: a data obtaining device for obtaining statistical data corresponding to an appearing object or objects whose appearances are identified in advance in one unit video out of a plurality of unit videos into which the video is divided in accordance with predetermined types of criteria, out of the appearing-object or objects, from among a database including a plurality of statistical data, each having statistical properties as for the appearing-object or objects set in advance as for predetermined types of items; and an estimating device for estimating the appearing-object or objects in the one unit video or in another unit video before or after the one unit video out of the plurality of unit videos, on the basis of the obtained statistical data.

In the present invention, the "video" indicates an analog or digital video, regarding various broadcast programs, such as territorial broadcasting, satellite broadcasting, and cable TV broadcasting, which belongs to various genres, such as, for example, drama, movie, sports, animation, cooling, music, and information. Preferably, it indicates video regarding digital broadcasted program such as terrestrial digital broadcasting. Alternatively, it indicates a personal video or video for special purpose, recorded by a digital video camera or the like.

Moreover, the "appearing-object or objects" in such a video indicates, for example, a character, animal, or some object appearing in a drama or movie, sports player, animation character, cook, singer, or newscaster, or the like, and it includes, in effect, all that appears in the video.

Moreover, with regard to the "appearing or appearance" in the present invention, if a person or character is taken for example, it is not limited to the condition that the figure of the character is seen in the video, and even if the characters is not seen in the video, it includes the condition that the voice of the character and the sound made by the character or the like are included. Namely, it includes, in effect, the case or thing that reminds audiences of the presence of the character.

If watching such a video not in real time but after recorded in advance on a digital video recording apparatus on which the video is relatively easily edited, such as a DVD recording apparatus and a HD recording apparatus, for example, an audience naturally has a request to watch only the desired appearing-object or objects. More specifically, for example, regarding a certain drama program, the audience possibly has such a request that "I would like to watch a scene with an actor ○ and an actress Δ in it". At this time, it is extremely hard, mentally, physically, or in terms of time, for the audience to check the video step by step and edit the video in a desired form. Thus, it causes a need to identify the appearing-object or objects in the video in some ways.

Particularly here, if using a known recognition technology, such as image recognition, pattern recognition, and sound recognition, the appearing-object or objects are identified at a relatively low accuracy, including some problems, such as "a face in profile cannot be identified", as explained in the conventional technology. If nothing is done, even if the audience has such a request that "I would like to watch a ΔΔ scene in which a main character ○○ appears", an extremely less-satisfactory video lacking the points which are in the same scene but in which the appearing-object or objects cannot be identified, is highly likely provided for the audience.

However, according to the appearing-object estimating apparatus of the present invention, it can cover the shortcomings as follows. Namely, according to the appearing-object estimating apparatus of the present invention, upon its operation, firstly, the data obtaining device obtains the statistical data corresponding to appearing-object or objects whose appearances are identified in advance in one unit video out of a plurality of unit videos into which the video is divided in accordance with predetermined types of criteria, out of the appearing-object or objects, from among a database including a plurality of statistical data, each having statistical properties about the appearing-object or objects set in advance about predetermined types of items.

In the present invention, the "statistical data having statistical properties" indicates, for example, data including information estimated or analogized from the past information accumulated to some extent. Alternatively, it indicates, for example, data including information operated, calculated, or identified from the past information accumulated to some extent. Namely, the "statistical data having statistical properties" typically indicates probability data for representing an event probability. The data having the statistical properties may be set for all or part of the appearing-object or objects.

For example, as one example of the generation of the statistical data, the statistical data may be generated on the basis of the appearing-object or objects which are identified by performing face recognition on one portion of the video (e.g. about 10% of the total). In this case, there is an unidentifiable portion and it is incomplete as continuous appearing-object data, but it can be used to make a reference value of, for example, what (who) appears with what probability or with what (whom), or the like. Incidentally, in this case, the one portion of the video is preferably selected, not from particular points but from the entire video, in an evenly-distributed manner.

Moreover, the "predetermined types of items" indicate, for example, an item about the appearing-object or objects itself, such as "a probability that a character A appears in the first broadcast of a drama program B", and an item for representing a relationship among appearing-object or objects, such as "a probability that a character A and a character B stay together".

In the present invention, the "unit video" is a video obtained by dividing the video of the present invention in accordance with the predetermined types of criteria. For example, if a drama program is taken for example, it indicates a video obtained by a single camera (referred to as a "shot" in this application, as occasion demands), a video continuous in terms of content (referred to as a "cut" which is a set of shots, in this application, as occasion demands), or a video in which the same space is recorded (referred to as a "scene" which is a set of cuts, in this application, as occasion demands), or the like. Alternatively, the "unit video" may be simply obtained by dividing the video in certain time intervals. Namely, the "predetermined types of criteria" in the present invention may be arbitrarily determined as long as the video can be divided into units which are somehow associated with each other.

The data obtaining device obtains, from the database, the statistical data corresponding to the appearing-object or objects whose appearances are identified in advance in one unit video out of such unit videos. Here, the aspect that " . . . identified in advance" may be arbitrary without any limitation. For example, it may be "identified" by that a broadcast program production company or the like distributes the indication that "○○ and ΔΔ appear in this scene" for each appropriate video unit (e.g. 1 scene), simultaneously with the distribution of video information or in proper timing. Alternatively, the appearing-object or objects in the unit video may be identified within the limit of the recognition technology, by using the already-described known image recognition, pattern recognition, or sound recognition technology or the like.

On the other hand, if such statistical data is obtained, the estimating device estimates appearing-object or objects in the one unit video or in another unit video before or after the one unit video out of the plurality of unit videos, on the basis of the obtained statistical data.

Here, the expression "estimate" indicates, for example, "to judge that an appearing-object or objects other than the already identified object or objects appear in one unit video or another video before or after the one unit video in the end, in view of a qualitative factor (e.g. tendency) and a quantitative factor (e.g. probability) indicated by the statistical data obtained by the data obtaining device. Alternatively, it indicates to judge what (who) is the appearing-object or objects other than the already identified one or ones. Therefore, it does not necessarily indicate to accurately identify the actual appearing-object or objects in the unit video.

For example, as one specific example of the expression "estimate", if it is identified that a character A appears in a certain one unit video (e.g. one shot), the data obtaining device may obtain data indicating that "the character A highly likely appears in the same shot as a character B" or the statistical data indicating that "the character B highly likely appears in this video". From the statistical judgment based on such data, it may be estimated such that the character B appears in the shot.

Moreover, the estimation in this manner can be applied not only to the appearing-object or objects in the unit video but also to the appearing-object or objects in another unit vide before or after the above unit video. For example, it is rare that a main character in a drama or the like appears only in one shot, and in most cases, the main character or characters appear in a plurality of shots. If there is statistical data for qualitatively and quantitatively defining such properties, for example, it is possible to easily estimate that "if the appearance of a character in one shot is identified, the character will appear in a next shot". In this case, for example, even in case of the unit video in which the presence of anyone is not recognized in the known face recognition technology or the like, the presence of the appearing-object can be estimated.

Incidentally, in the appearing-object estimating apparatus of the present invention, the criteria of the estimation by the estimating device, based on the obtained statistical data, may be arbitrarily set, For example, if a certain event probability indicated by the obtained statistical data is beyond a predetermined threshold value, it may be considered that the event occurs. Alternatively, if the appearing-object can be more preferably estimated from the obtained data, experimentally, experientially, or in various methods, such as simulations, the estimation may be performed in such methods.

As described above, according to the appearing-object estimating apparatus of the present invention, even in case of the appearing-object or objects considered unidentifiable in the known recognition technology (e.g. a character in profile), its presence can be estimated by the statistical method whose concept is totally different from that of the conventional method, and the identification accuracy of identifying the appearing-object or objects can be remarkably improved.

For example, if a shot showing a person in profile, a shot showing the person small, and a shot showing only a part of his body are mixed in a certain cut, a human can sense and instantly judge who the person is. In the conventional recognition technology, however, it is only recognized such that there is no one appearing in the cut, or that there is an unidentified person appearing. In contrast, according to the appearing-object estimating apparatus of the present invention, such sensible mismatch can be improved and the appearing-object identification extremely similar to the human's sensibility can be performed.

Incidentally, the result of the appearing-object estimation by the estimating device can adopt a plurality of aspects in terms of its properties. As described above, if the appearing-object or objects in one unit video are not uniquely estimated, it may be constructed such that the estimation result can be arbitrarily selected on the audience side. Alternatively, if objective credibility can be numerically defined for the plurality of types of results obtained, the estimation result may be provided in order based on the credibility.

In addition, according to the present invention, obviously, as the probability is higher that the estimation by the estimating device is accurate, it is more meaningful. Even if the probability is not very high, as compared to a case where the estimation is not performed, it is extremely advantageous in terms of the improvement in the identification accuracy of identifying the characters appearing in the video. In particular, the present invention can be easily combined with the known recognition technology. Thus, as long as the probability that the estimation by the estimating device is accurate is a positive value greater than 0, as compared to the case where the estimation is not performed, it is remarkably advantageous in terms of the improvement in the identification accuracy of identifying the characters appearing in the video.

In one aspect of the appearing-object estimating apparatus of the present invention, it is further provided with an inputting device for urging input of data as for an appearing-object or objects which an audience desires to watch, the data obtaining device obtaining the statistical data on the basis of the inputted data as for the appearing-object or objects.

According to this aspect, for example, an audience can input the data about the appearing-object or objects which the audience desires to watch, through the inputting device. Here, the "data about the appearing-object or objects which the audience desires to watch" indicates, for example, data for representing the indication that "I would like to see an actor ○○" or the like. The data obtaining device obtains the statistical data on the basis of the inputted data. Therefore, it is possible to efficiently extract a portion in which the appearing-object or objects desired by the audience appear or are estimated to appear.

In another aspect of the appearing-object estimating apparatus of the present invention, it is further provided with an identifying device for identifying the appearing-object or objects in the one unit video, on the basis of geometric features of the one unit video.

Such an identifying device indicates, i.e., a device for identifying the appearing-object or objects by using the above-described face recognition technology, or pattern recognition technology. By providing such an identifying device, the appearing-object estimation can be performed with relatively high credibility within the identification limit, and the appearing-object or objects can be identified, in a so-called complementary manner, with the estimating device. Therefore, the appearing-object or objects can be identified in the end, highly accurately.

In one aspect of the appearing-object estimating apparatus of the present invention provided with the identifying device, the estimating device does not estimate the appearing-object or objects which are identified by the identifying device from among the appearing-object in the one or another unit video, but estimates the appearing-object or objects which are not identified by the identifying device.

In case that the identifying device is provided, for example, if the credibility of the appearing-object identification by the identifying device is higher than that of the estimating device, it is hardly necessary to perform the estimation by the estimating device, on the appearing-object or objects identified by the identifying device. According to this aspect, the processing load of the appearing-object estimation by the estimating device can be reduced, so that it is effective.

In another aspect of the appearing-object estimating apparatus of the present invention, it is further provided with a meta data generating device for generating predetermined meta data which at least describes information as for the appearing-object or objects in the one unit video, on the basis of a result of estimation by the estimating device.

The "meta data" described herein indicates data which describes content information about certain data. The digital video data can be associated with the meta data, and because of the meta data, information can be accurately searched for in response to an audience's request. According to this aspect, the appearing-object or objects in the unit video are estimated, and the meta data based on the estimation result is generated by the meta data generating device, so that the video can be preferably edited. Incidentally, with regard to the expression "on the basis of a result of estimation", it indicates in effect that the meta data may be generated which only describes the estimation result obtained by the estimating device, or that the meta data may be generated which describes information about appearing-object or objects which are eventually identified, together with the already identified appearing-object or objects.

In contrast, it may be constructed such that the meta data carries the statistical data and that this statistical data is extracted and stored in the database.

In another aspect of the appearing-object estimating apparatus of the present invention, the data obtaining device obtains probability data for representing such a probability that each of the appearing-object or objects appears in the video, as at least one portion of the statistical data.

According to this aspect, the data obtaining device obtains the probability data for representing such a probability that each of the appearing-object or objects appears in the video, as at least one portion of the statistical data. Thus, it is possible to estimate the appearing-object or objects, highly accurately.

Incidentally, the "video" described herein may be all or at least one portion of the unit video, such as the shot, cut, or scene described above, a video corresponding to one time of broadcast, and one series of videos with several times of broadcasts collecting.

The data, set for each of the appearing-object or objects, may be not necessarily set for all the appearing-object or objects in the video. For example, the probability of the appearance in the video may be set only for the appearing-object or objects which appear at a relatively high frequency.

In another aspect of the appearing-object estimating apparatus of the present invention, if one appearing object of the appearing-object or objects appears in the unit video, the data obtaining device obtains probability data for representing such a probability that the one appearing-object continuously appears in M unit video or videos (M: natural number) continued from the unit video in which the one appearing-object appears, as at least one portion of the statistical data.

According to this aspect, if one appearing object of the appearing-object or objects appears in the unit video, the data obtaining device obtains the probability data for representing such a probability that the one appearing-object continuously appears in M unit video or videos continued from the unit video, as at least one portion of the statistical data. Thus, it is possible to estimate the appearing-object or objects, highly accurately.

Incidentally, the value of the variable M is not subjected to limitation as long as it is a natural number, and preferably, it is properly determined depending on the properties of the video. For example, in case of a drama or the like, if the value of M is set too large, the probability becomes almost zero.

Thus, a plurality of M values may be set in such a range that the data can be efficiently used.

In another aspect of the appearing-object estimating apparatus of the present invention, if one appearing-object of the appearing-object or objects appears in the unit video, the data obtaining device obtains probability data for representing such a probability that N other appearing-object or objects (N: natural number) different from the one appearing-object appear in the unit video in which the one appearing-object appears, as at least one portion of the statistical data.

According to this aspect, if one appearing-object of the appearing-object or objects appears in the unit video, the data obtaining device obtains the probability data for representing such a probability that N other appearing-object or objects (or N people) different from the one appearing-object appear in the unit video, as at least one portion of the statistical data. Thus, it is possible to estimate the appearing-objects, highly accurately.

Incidentally, the value of the variable N is not subjected to limitation as long as it is a natural number, and preferably, it is properly determined depending on the properties of the video. For example, in case of a drama or the like, it is rare that many people who can be regarded as the appearing-object or objects appear in one unit video, and if the value of N is set too large, the probability becomes almost zero. Thus, a plurality of N values may be set in such a range that the data can be efficiently used.

In another aspect of the appearing-object estimating apparatus of the present invention, if one appearing-object of the appearing-object or objects appears in the unit video, the data obtaining device obtains probability data for representing such a probability that each of the appearing-object or objects other than the one appearing-object appears in the unit video in which the one appearing-object appears, as at least one portion of the statistical data.

According to this aspect, if one appearing-object of the appearing-object or objects appears in the unit video, the data obtaining device obtains the probability data for representing such a probability that each of the appearing-object or objects other than the one appearing-object appears in the unit video, as at least one portion of the statistical data. Thus, it is possible to estimate the appearing-objects, highly accurately.

In another aspect of the appearing-object estimating apparatus of the present invention, if one appearing object of the appearing-object or objects and another appearing-object different from the one appearing-object appear in the unit video, the data obtaining device obtains probability data for representing such a probability that the one appearing-object and the another appearing-object continuously appear in L unit video or videos (L: natural number) continued from the unit video in which the one appearing-object and the another appearing object appear, as at least one portion of the statistical data.

According to this aspect, if one appearing-object of the appearing-object or objects and another appearing-object different from the one appearing-object appear in the unit video, the data obtaining device obtains probability data for representing such a probability that the one appearing-object and the another appearing-object continuously appear in L unit video or videos (L: natural number) continued from the unit video, as at least one portion of the statistical data. Thus, it is possible to estimate the appearing-objects, highly accurately.

Incidentally, the value of the variable L is not subjected to limitation as long as it is a natural number, and preferably, it is properly determined depending on the properties of the video. For example, in case of a drama or the like, if the value of L is set too large, the probability becomes almost zero. Thus, a plurality of L values may be set in such a range that the data can be efficiently used.

In another aspect of the appearing-object estimating apparatus of the present invention, it is further provided with: an audio information obtaining device for obtaining audio information corresponding to each of the one unit video and the another unit video; and a comparing device for mutually comparing the audio information corresponding to each of the unit videos, the data obtaining device obtaining probability data for representing such a probability that the one unit video and the another unit video are in a same situation, in association with a result of comparison by the comparing device, as at least one portion of the statistical data.

The "audio information" described herein may be, for example, a sound pressure level in the entire video, or an audio signal with a particular frequency. As long as it is some physical or electric numerical number regarding the audio of the unit video, its aspect is arbitrary.

According to this aspect, the data obtaining device obtains the probability data for representing such a probability that the one unit video and the another unit video are in a same situation, in association with a result of comparison by the comparing device, as at least one portion of the statistical data. Thus, it is possible to estimate the appearing-object or objects, highly accurately.

Incidentally, the probability data is data for judging the continuity of the unit videos, and seems different from the "data corresponding to the appearing-object or objects whose appearance is identified in advance in one unit video". However, if the unit videos are continuous, the identified appearing-object or objects appear continuously. Thus, this is also in a range of the corresponding data.

Incidentally, the "video in the same situation" described herein indicates a video group which is highly related or highly continuous, such as each shot in the same cut and each cut in the same scene.

<Appearing-Object Estimating Method>

The above object of the present invention can be also achieved by an appearing-object estimating method for estimating appearing-object or objects appearing in a recorded video, the appearing-object estimating method provided with: a data obtaining process of obtaining one statistical data corresponding to an appearing-object or objects whose appearances are identified in advance in one unit video out of a plurality of unit videos into which the video is divided in accordance with predetermined types of criteria, out of the appearing-object or objects, from among a database including a plurality of statistical data, each having statistical properties as for the appearing-object or objects set in advance as for predetermined types of items; and an estimating process of estimating the appearing-object or objects in the one unit video or in another unit video before or after the one unit video out of the plurality of unit videos, on the basis of the obtained one statistical data.

According to the appearing-object estimating method of the present invention, it is possible to improve the identification accuracy of identifying the objects appearing in the video, thanks to each device in the above-mentioned appearing-object estimating apparatus and corresponding each process.

<Computer Program>

The above object of the present invention can be also achieved by a computer program of instructions for tangibly embodying a program of instructions executable by a computer system, to make the computer system function as the estimating device.

According to the computer program of the present invention, the above-mentioned appearing-object estimating apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be also achieved by a computer program product in a computer-readable medium for tangibly embodying a program of instructions executable by a computer, to make the computer function as the estimating device.

According to the computer program product of the present invention, the above-mentioned appearing-object estimating apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned appearing-object estimating apparatus of the present invention.

Incidentally, in response to the various aspects of the above-mentioned appearing-object estimating apparatus of the present invention, the computer program of the present invention can also adopt various aspects.

As explained above, the appearing-object estimating apparatus is provided with the data obtaining device and the estimating device, so that it can improve the identification accuracy of identifying the appearing-object or objects. The appearing-object estimating method is provided with the data obtaining process and the estimating process, so that it can improve the identification accuracy of identifying the appearing-object or objects. The computer program makes a computer system function as the estimating device, so that it can realize the appearing-object estimating apparatus, relatively easily.

BRIEF DESCRIPTION OF DRAWINGS

FIG. 1 is a block diagram showing a character (i.e., an appearing-character or appearing-persona) estimation system including a character estimating apparatus in an embodiment of the present invention.

FIG. 2 are schematic diagrams showing human identification performed on an identification device of the character estimating apparatus shown in FIG. 1.

FIG. 3 is a schematic diagram showing a correlation table indicating a correlation among characters in a video displayed on a displaying apparatus in the character estimation system shown in FIG. 1.

FIG. 4 is a schematic diagram showing one portion of the structure of the video displayed on the displaying apparatus in the character estimation system shown in FIG. 1.

FIG. 5 is a diagram showing a procedure of character estimation, in a first operation example of the character estimating apparatus shown in FIG.

FIG. 6 is a diagram showing a procedure of character estimation, in a second operation example of the character estimating apparatus shown in FIG. 1.

FIG. 7 is a diagram showing a procedure of character estimation, in a third operation example of the character estimating apparatus shown in FIG. 1.

DESCRIPTION OF REFERENCE CODES

10 . . . character estimating apparatus, 20 . . . statistical DB (Data Base), 21 . . . correlation table, 30 . . . recording/reproducing apparatus, 31 . . . memory device, 32 . . . reproduction device, 40 . . . displaying apparatus, 41 . . . video, 100 . . . control device, 110 . . . CPU, 120 . . . ROM, 130 . . . RAM, 200 . . . identification device, 300 . . . audio analysis device, 400 . . . meta data generation device, 1000 . . . character estimation system

BEST MODE FOR CARRYING OUT THE INVENTION

Hereinafter, the best mode for carrying out the present invention will be explained in each embodiment in order with reference to the drawings.

Hereinafter, the preferred embodiment of the present invention will be described with reference to the drawings.

In FIG. 1, a character estimation system 1000 is provided with: a character estimating apparatus 10; a statistical database (DB) 20; a recording/reproducing apparatus 30; and a displaying apparatus 40.

The character estimating apparatus 10 is provided with: a control device 100; an identification device 200; an audio analysis device 300; and a meta data generation device 400. The character estimating apparatus 10 is one example of the "appearing-object estimating apparatus" of the present invention, constructed to be operable to identify characters (i.e. one example of the "appearing objects" in the present invention) in a video displayed on the displaying apparatus 40.

The control device 100 is provided with: a CPU (Central Processing Unit) 110; a ROM (Read Only Memory) 120; and a RAM (Random Access Memory 130.

The CPU 110 is a unit for controlling the operation of the character estimating apparatus 10. The ROM 120 is a read-only memory, which stores to therein a character estimation program, as one example of the "computer program" of the present invention. The CPU 110 is constructed to function as one example of the "data obtaining device" and the "estimating device" of the present invention, or to perform one example of the "data obtaining process" and the "estimating process" of the present invention, by executing the character estimation program. The RAM 130 is a rewritable memory and is constructed to temporarily store various data generated when the CPU 110 executes the character estimation program.

The identification device 200 is one example of the "identifying device" of the present invention, constructed to identify characters appearing in a video displayed on the displaying apparatus 40 described later, on the basis of their geometric feature or features.

Here, with reference to FIG. 2, the details of the character identification by the identification device 200 will be explained, FIG. 2 are schematic diagrams showing human identification performed on the identification device 200.

In FIG. 2, the identification device 200 is constructed to perform the character identification on a video displayed on the displaying apparatus 40 by using an identifiable frame and a recognizable frame.

The identification device 200 is constructed to recognize the presence of a person and identify who the person is, if the person's face is displayed on an area not less than the area defined by the identifiable frame (FIG. 2(*a*)). Moreover, the identification device 200 is constructed to recognize the presence of a person, if the person's face is displayed on an area that is less than the area defined by the identifiable frame but not less than the area defined by the recognizable frame (FIG. 2(*b*)). One the other hand, the identification device 200 cannot even recognize the presence of a person in a video if the person's face is displayed on an area less than the area defined by the recognizable frame (FIG. 2(*c*)). Moreover, the identification device 200 aims only at a human's face almost in the front, for the identification. Therefore, the identification device 200 cannot identify, for example, a face in profile (i.e., on his or her side), even if it is displayed on an area not less than the area defined by the identifiable frame.

Back in FIG. 1, the audio analysis device 300 is one example of the "audio information obtaining device" and the "comparing device" of the present invention, constructed to obtain a sound released or diffused from the displaying apparatus 40 and judge the continuity of shots, described later, on the basis of the obtained sound.

The meta data generation device 400 is one example of the "meta data generating device" of the present invention, constructed to generate meta data including information about the character (persona) estimated by the CPU 110 executing the character estimation program.

The statistical DB 20 is a database for storing therein data P1, data P2, data P3, data P4, data P5, and data P6, each of which is one example of the "statistical data having statistical properties" in the present invention.

The recording/reproducing apparatus 30 is provided with: a memory device 31; and a reproduction device 32.

The memory device 31 stores therein the video data of a video 41 (one L5 example of the "video" in the present invention). The memory device 31 is, for example, a magnetic recording medium, such as a HD, or an optical information recording medium, such as a DVD. The memory device 31 stores therein the video 41, as digital-format video data The reproduction device 32 is constructed to subsequently read the video data stored in the memory device 31, generate a video signal to be displayed on the displaying apparatus, as occasion demands, and supply it to the displaying apparatus 40. Incidentally, the recording/reproducing apparatus 30 has a recording device for recording the video 41 into the memory device 31, but the illustration thereof is omitted.

The displaying apparatus 40 is a display apparatus, such as, for example, a plasma display apparatus, a liquid crystal display apparatus, an organic EL display apparatus, or a CRT (Cathode Ray Tube) display apparatus, and it is constructed to display the video 41 on the basis of the video signal supplied by the reproduction device 31 of the recording/reproducing apparatus 30. Moreover, the displaying apparatus 40 is provided with various sound making (i.e., releasing or diffusing) devices, such as a speaker, to provide audio information for an audience.

Next, with reference to FIG. 3, the details of each data stored in the statistical database 20 will be explained. FIG. 3 is a schematic diagram showing a correlation table 21 indicating a correlation among characters in a video displayed on a displaying apparatus in the character estimation system shown in FIG. 1.

In FIG. 3, the correlation table 21 is a table on which a character Hm (m=01, 02, . . . , 13) and a character Hn (n=01, 02, . . . , 13) are arranged in a matrix. Here, both the characters Hm and Hn represent the characters in the video 41, and if "m=n", they represent the same character (i.e., the same persona). In the embodiment, it is assumed that there are 13 characters in the video 41. Incidentally, the number of characters is not limited to the one illustrated herein, and may be arbitrarily set. Moreover, the characters described on the correlation table 21 are not necessarily all the characters appearing in the video 41, and may be only the characters that play important roles.

On the correlation table 21, an element corresponding to the intersection of the character Hm with the character Hn represents a statistical data group "Rm,n" indicating the correlation between the character Hm and the character Hn. The statistical data group "Rm,n" is expressed by the following equation (1).

$$Rm,n=P4(Hm|Hn),P5(S|Hm,Hn) \quad (1)$$

Here, P4 (Hm|Hn) is data for representing the probability that the character Hm appears in the same shot if there is the character Hn, and it corresponds to the data P4 stored in the statistical DB 20. Incidentally, in the embodiment, the data P4 is limited to the shot, but may be set in the same manner, for example, for a "scene" or a "cut".

Moreover, P5 (S|Hm, Hn) is data for representing the probability that the appearance continues over S shots if the character Hm and the character Hn appear in one shot in the video 41, and it corresponds to the data P5 stored in the statistical DB 20.

On the other hand, on the correlation table 21, only if "m=n", the element corresponding to the intersection of the character Hm with the character Hn represents a statistical data group "In(=Im)" about the individual character. The statistical data group "In" is defined by the following equation (2).

$$In=P1(Hn),P2(S|Hn),P3(N|Hn) \quad (2)$$

Here, P1 (Hn) is data for representing the probability that the character Hn appears in the video 41, and it corresponds to the data P1 stored in the statistical DB 20.

Moreover, P2 (S|Hn) is data for representing the probability that the appearance continues over S shots if the character Hn appears in one shot in the video 41, and it corresponds to the data P2 stored in the statistical DB 20.

Moreover, P3 (N|Hn) is data for representing the probability that N characters (N: natural number) who are different from the character Hn appear if there is the character Hn in one shot in the video 41, and it corresponds to the data P3 stored in the statistical DB 20.

Incidentally, the statistical DB 20 stores therein the data P6 which is not defined on the table 21. The data P6 is expressed by P6 (C|Sn), and it is data for representing the probability that (C+1) shots between a shot (Sn·C) and a shot Sn are in the same cut, in association with the audio recognition result of the audio analysis device 300.

Namely, each of the data P1 to P6 stored in the statistical DB 20 is one example of the "probability data" in the present invention.

OPERATION OF EMBODIMENT

Next, the operation of the character estimating apparatus 10 in the embodiment will be explained.

Firstly, with reference to FIG. 4, the details of the video associated with the operation of the embodiment will be explained. FIG. 4 is a schematic diagram showing one portion of the structure of the video 41.

The video 41 is a picture program with plot, such as, for example, a drama. In FIG. 4, a scene SCI, which is one scene of the video 41, is provided with four cuts C1 to C4. Moreover, the cut C1 out of them is further provided with six shots SH1 to SH5. Each shot is one example of the "unit video" of the present invention, with the shot SH1 having 10 seconds, the SH2 having 5 seconds, the SH3 having 10 seconds, the SH4 having 5 seconds, the SH5 having 10 seconds, and the SH6 having 5 seconds. Therefore, the cut C1 is a 45-second video.

FIRST OPERATION EXAMPLE

Next, with reference to FIG. 5, the first operation example of the present invention will be explained. FIG. 5 is a diagram showing a procedure of the character estimation in the cut C1 of the video 41. Incidentally, the character identification is realized by the CPU 110 executing the character estimation program stored in the ROM 130.

Firstly, the CPU 110 controls the reproduction device 32 of the recording/reproducing apparatus 30 to display the video 41 on the displaying apparatus 40. At this time, the reproduction device 32 obtains the video data about the video 41 from the memory device 31, and also generates the video signal for displaying it on the displaying apparatus 40 and supplies it to and displays it on the displaying apparatus 40. When the display of the cut C1 is started in this manner, as shown in FIG. 5, firstly, the shot SH1 is displayed on the displaying apparatus 40.

Incidentally, in FIG. 5, it is assumed that the item of "video" indicates the display content of the displaying apparatus 40 and that each character is represented by Hxp (p=0, 1, 2, . . . , P (wherein P is a sequential natural number)). Moreover, it is assumed that the cut C1 is provided with the shots SH1 to SH6 and that the cut C1 is a cut with two people (i.e., two characters) of a character H01 and a character H02 (refer to the item of "fact" in FIG. 5).

When the display of the video 41 is started, the CPU 110 controls each of the identification device 200, the audio analysis device 300, and the meta data generation device 400, to start the operation of each device.

The identification device 200 starts the character identification in the video 41, in accordance with the control of the CPU 110. In the shot SH1 of the cut C1, Hx1 and Hx2 are both displayed on sufficiently large areas, so that the identification device 200 identify the two as the character H01 and the character H02, respectively.

If the characters are identified by the identification device 200, the CPU 110 controls the meta data generation device 400 to generate meta data about the shot SH1. At this time, the meta data generation device 400 generates the meta data describing that "there are the character H01 and the character H02 in the shot SH1". The generated meta data is stored into the memory device 31 in association with the video data about the shot SH1.

Incidentally, the identification device 200 is constructed to judge that the shot of the video is the same (i.e., not changed) if a geometric change amount of the display content on the displaying apparatus 40 is in a predetermined range.

10 seconds after the display of the shot SH1 is started (hereinafter considered as an "elapsed time") (refer to the item of "time" in FIG. 5), the video changes to the shot SH2. Namely, the geometric change occurs in the display content of the displaying apparatus 40. Here, the identification device 200 judges that the shot is changed, and newly starts the character identification. The shot SH2 focuses on the character H01, and Hx4 as the character H02 is almost out of the display area of the displaying apparatus 40. In this condition, the identification information 200 cannot even recognize the presence of Hx4, so that the character identified by the identification device 200 is only Hx3, i.e. the character H01.

Here, the CPU 110 starts the estimation of the character in order to complement the character identification performed by the identification device 200. Firstly, the CPU 110 temporarily stores the result of audio analysis by the audio analysis device 300, into the RAM 130. The stored audio analysis result is the result of comparison of audio data obtained from the displaying apparatus 40, before and after the time point judged to be the change of the shot by the identification device 200. Specifically, it is a difference in sound pressure before and after the time point, calculated by the audio analysis device 300, or comparison data of the included frequency bands.

The CPU 110 obtains the data P6 from the statistical DB 20 in view of the audio analysis result. More specifically, it obtains "P6 (C=1|S2)" in the data P6. This is data for representing the probability that the two continuous shots from the shot SH1 to the shot SH2 belong to the same cut.

The CPU 110 verifies the obtained data P6 and the audio analysis result stored in the RAM 130. According to this verification, the probability that the series of shots are in the same shot is greater than 70%.

Then, the CPU 110 obtains the data P4 from the statistical DB 20 because there are appearing the character H01 and the character H02 in the shot SH1. More specifically, it obtains "P4 (H02|H01)" in the data P4. This is data for representing the probability that the character H02 appears in the same shot if there is the character H01. According to the obtained data P4, this probability is greater than 70%.

Moreover, the CPU 110 obtains the data P5 from the statistical DB 20 because there are appearing the characters H01 and H02 in the shot SH1. More specifically, it obtain "P5 (S=2|H02,01)" in the data P5. This is data for representing the probability that the appearance continues over two shots if the character H01 and the character H02 appear in one shot. According to the obtained data P5, this probability is greater than 70%.

The CPU 110 regards the obtained probabilities as estimation factors, and estimates that the character H02 also appears in the shot SH2 in the end.

In response to the estimation result, the meta data generation device 400 generates meta data describing that "there are the characters H01 and H02 in the shot SH2".

When the elapsed time is 15 seconds, the video is changed to the shot SH3. Even in this case, the identification device 200 judges that the shot is changed, and newly starts the character identification. The shot SH3 focuses on the character H02, and Hx5 as the character H01 is almost out of the display area of the displaying apparatus 40. In this condition, the identification information 200 cannot even recognize the presence of Hx5, so that the character identified by the identification device 200 is only Hx6, i.e. the character H02.

Even here, the CPU 110 estimates the character as in the shot SH2. At this time, the CPU 110 obtains the data P6, the data P4, and the data P5. L5 from the statistical DB 20. More specifically, as the estimation factors, the probability that the series of three shots from the shot SH1 to the shot SH3 are in the same cut is given from the data P6, the probability that the character H02 appears in the same shot if there is the character H01 is given from the data P4, and the probability that the appearance continues over three shots if the character H01 and the character H02 appear in one shot is given from the data P5. The CPU 110 estimates, from these estimation factors, that the character H01 also appears in the shot SH3. In response to the estimation result, the meta data generation device 400 generates meta data describing that "there are the characters H01 and H02 in the shot SH3".

When the elapsed time is 30 seconds and the shot is changed again, the identification device 200 starts the character identification for the shot SH5. However, in the shot SH5, since each of Hx9 and Hx10 is displayed on an area less than the area defined by the identifiable frame, the identification device 200 can recognize the presence of two people but cannot identify who they are.

Since the appearance of the two people in the shot SH5 is already recognized by the identification device 200, the CPU 110 uses the estimation device 200 to estimate who they are. Namely it obtains the data PG, the data P4, and the data P5 from the statistical DB 20.

Firstly, as the estimation factors, the probability that the series of five shots from the shot SH1 to the shot SH5 are in the same cut is given from the data P6, the probability that the character H02 appears in the same shot if there is the character H01 is given from the data P4, and the probability that the appearance continues over five shots if the character H01 and the character H02 appear in one shot is given from the data P5. The CPU 110 estimates, from these estimation factors, that the characters in the shot SH5 are the characters H01 and H02. In response to the estimation result, the meta data generation device 400 generates meta data describing that "there are the characters H01 and H02 in the shot SH5".

When the elapsed time is 40 seconds and the video is changed to the shot SH6, the identification device 200 newly starts the character identification. Here, as in the shot SH1 and the shot SH4, it identifies that the appearing characters are the characters H01 and H02, and ends the character identification associated with the cut C1.

Now, the effects of the character estimating apparatus 10 will described in association with the meta data generated by the meta data generation device 400.

The meta data generation device 400 generates the meta data describing that "the appearing characters are the characters H01 and H02" for all the shots of the cut C1 in response to the results of the identification by the identification device 200 and the estimation by the CPU 110 described above. Therefore, for example, in the future when an audience searches for the "cut in which both the characters H01 and H02 appear", the complete cut C1 without lack of the shot can be easily extracted, using the meta data as an index.

On the other hand, as a comparison example, if meta data is generated only on the basis of the result of the character identification by the identification device 200 (refer to the comparison example in FIG. 5), the shots describing that both the characters H01 and H02 appear in the cut C1 are only the shot SH1, the shot SH4, and the shot SH6. If the cut C1 is extracted in the same manner using the meta data as the index, the cut C1 is extracted with lack of the shot SH2, the shot SH3, and the shot SH5. This makes all the conversations and video be choppy or intermittent, and results in the extremely incomplete extraction, which dissatisfies the audience.

As explained above, according to the character estimating apparatus 10 in the embodiment, it facilitates an improvement in the identification accuracy of a person appearing in the video.

Incidentally, in the above-mentioned first operation example, the CPU 110 does not particularly perform the character estimation on each of the shot SH1, the shot SH4, and the shot SH6; however, it possibly positively obtains some statistical data from the statistical DB, 20 to perform the estimation. In that case, it is also possible, for example, that an absent person is estimated as the character. However, the CPU 110 can be easily set not to perform the estimation on the character identified by the identification device 200. Thus, there is no chance to estimate that the already identified character is "absent". Namely, the estimation result is possibly redundant, but a probability to deteriorate the accuracy of identifying all the appearing people without omission can be almost zero, so that it is advantageous.

SECOND OPERATION EXAMPLE

Next, with reference to FIG. 6, the second operation example of the character estimating apparatus 10 of the present invention will be explained.

FIG. 6 is a diagram showing a procedure of the character estimation in the cut C1 of the video 41. It is assumed that the content of the cut C1 is different from that in the above-mentioned East operation example. Incidentally, in FIG. 6, the same or repeating points as those in FIG. 5 carry the same references, and the explanation thereof will be omitted.

In FIG. 6, the cut C1 is provided with six shots, as in the first operation example. However, there is only the character H01 in all the shots, with no other characters.

In the shots SH1, SH3, and SH6 in FIG. 6, Hx1, Hx3, and Hx5 are displayed on sufficiently large display areas, and each can be easily identified as the character H01 by the identification device 200.

On the other hand, in the shot SH2, Hx2 is displayed at it's portion lower than the trunk of the body. Thus, the identification device 200 cannot recognize the presence of the person.

Here, in order to estimate whether there is any character in the shot SH2 and further to estimate who the character is, the CPU 110 obtains each of the data P6, the data P1, and the data P2 from the statistical DB 20. Specifically, it obtains each of "P6 (C=1|S2)" in the data P6, "P1 (H01)" in the data P1, and "P2 (S2|H01)" in the data P2.

Among these data, "P6 (C=1|S2)" is used to judge the continuity of the shots, as already described in the first operation example. Namely, the probability that the series of two shots from the shot SH1 to the shot SH2 are in the same cut is given as the estimation factor.

Moreover, from "P1 (H01)", the probability that the character H01 appears in the video 41 is given as the estimation factor. Furthermore, from "P2 (S2|H01)", the probability that the appearance continues over two shots if the character H01 appears in one shot is given as the estimation factor.

The CPU 110 judges, from these three estimation factors, that the shot SH2 is highly likely in the same cut as the shot SH1, that the character H01 highly likely appears, and that the character H01 highly likely appears continuously in the two shots, and it estimates that the character H01 appears in the shot SH2.

Then, if the video is changed to the shot SH4, Hx4 is not displayed on the displaying apparatus 40 and only a "cigarette" owned by Hx4 is displayed. Here, the audience can easily imagine from this cigarette that Hx4 is the character H01, but the identification device 200 cannot even recognize the presence of a person.

Even here, the CPU 110 estimates that the character H01 appears in the shot SH4 on the basis of the data P6, the data P1, and the data P2, in the same manner as that the character H01 is estimated in the shot SH2.

Moreover, if the video is changed to the shot SH5, the displaying apparatus 40 displays a "coffee cup". Even here, the audience can easily imagine that the character indicated by this item is the character H01, but the identification device 200 cannot even recognize the presence of a person.

Here, the CPU 110 estimates that the character H01 appears in the shot SH5 as well, in the same manner as that the appearance of the character H01 is estimated in the shot SH2 and the shot SH4.

From the series of estimation operations in the cut C1, the indication that the character H01 appears in all the six shots from the shot SH1 to the shot SH6, is written into the meta data generated by the meta data generation device 400.

On the other hand, as in the first operation example, as compared to the comparison example, the shots with the character H01 appearing in the cut C1 are only the shots SH1, SH3, and SH5. If the "cut in which the character H01 appears solo" is searched for, for example, these discontinuous three shots are extracted, and an extremely unnatural video is provided for the audience.

As described above, even in the second operation example, the effects of the character estimation in the embodiment are fully achieved, and the character identification accuracy is improved remarkably.

THIRD OPERATION EXAMPLE

Next, with reference to FIG. 7, the third operation example of the character estimating apparatus 10 of the present invention will be explained. FIG. 7 is a diagram showing a procedure of the character estimation in the cut C1 of the video 41. The content of the cut C1 is different from that in the above-mentioned operation examples. Incidentally, in FIG. 7, the same or repeating points as those in FIG. 5 carry the same references, and the explanation thereof will be omitted.

In FIG. 7, the cut C1 is provided with a single shot SH1. In the shot SH1, there are the characters H01, H02, and H03 appearing, but the two other than the character H01 are displayed on areas less than the area defined by the recognizable frame of the identification device 200. Thus, it is only the character H01, identified by the identification device 200, that the presence is recognized, and the other two are not recognized even in their presence. Here, the CPU 110 estimates the characters other than the character H01 as follows.

Firstly, the CPU 110 obtains the data P4 and the data P3 from the statistical DB 20. More specifically, it obtains "P4 (H02, H03|H01)" in the data P4 and "P3(2|H01)" in the data P3.

The former is data for representing the probability that the character H02 and the character H03 appear in the same shot if there is the character 110 in one shot, and the probability is greater than 70%. Moreover, the latter is data for representing the probability that the two characters other than the character H01 appear in the same shot, and the probability is greater than 30%.

The CPU 110 uses these data as the estimation factors and estimates that the character H02 and the character H03 appear in addition to the character H01. Therefore, the indication that the characters in the shot SH1 are the characters H01, H02, and H03 is written into the meta data generated by the meta data generation device 400.

On the other hand, in the comparison example, only the result of the character identification by the identification device 20 is reflected, so that the generated meta data only describes that the character in the shot SH1 is the character H01. Therefore, for example, in case that the "cut in which the characters H01, H02, and H03 appear" is searched for, according to the embodiment, the cut C1 in the third operation example can be instantly searched for. However, in the comparison example, the audience has to searched a huge number of cuts in which the character H01 appears, for the desired cut, and it is extremely inefficient.

Incidentally, the data stored in the statistical DB 20 may be arbitrarily set, even except the above-mentioned data P1 to P6, as long as capable of estimating the characters appearing in the video. For example, in a drama program broadcasted over several times or the like, what may be set is data for representing the "probability that a character ΔΔ appears in the ○○-th broadcast", or data for representing the "probability that N characters appear except a character ΔΔ and a character □□ if there are the character ΔΔ and the character □□ appearing".

Incidentally, the character estimating apparatus 10 may be provided with an inputting device, such as a keyboard and a touch button, through which a user can enter data. Through the inputting device, the user may give the data about the character that the user desires to watch, to the character estimating apparatus 10. In this case, the character estimating apparatus 10 may select and obtain, from the statistical DB 20, the statistical data corresponding to the inputted data and search for the cut and the shot or the like in which the character appears. Alternatively, in the above-mentioned each embodiment, it may positively estimate whether or not there is the character that the user desires to watch, with reference to the obtained statistical data.

Incidentally, the embodiment describes the aspect of identifying the character, as one example of the "appearing-object" in the present invention. However, as already described, the "appearing-object" in the present invention is not limited to human beings, and may be animals, plants, or some objects, and of course, these things appearing in the video can be identified in the same manner as in the embodiment.

The present invention is not limited to the above-described embodiments, and various changes may be made, if desired, without departing from the essence or spirit of the invention which can be read from the claims and the entire specification. An appearing-object estimating apparatus and method, and a computer program, which involve such changes, are also intended to be within the technical scope of the present invention.

INDUSTRIAL APPLICABILITY

The appearing-object estimating apparatus and method, and the computer program of the present invention can be applied to an appearing-object estimating apparatus which can improve an accuracy of identifying an object appearing in a video. Moreover, they can be applied to an appearing-object estimating apparatus or the like, which is mounted on or can be connected to various computer equipment for consumer use or business use, for example.

The invention claimed is:

1. An appearing-object estimating apparatus for estimating an appearing-object or objects appearing in a recorded video, said appearing-object estimating apparatus comprising:

a data obtaining device for obtaining statistical data corresponding to an appearing-object or objects whose appearances are identified in advance in one unit video out of a plurality of unit videos into which the video is divided in accordance with predetermined types of criteria, out of the appearing-object or objects, from among a database including a plurality of statistical data, each having statistical properties as for the appearing-object or objects set in advance as for predetermined types of items; and an estimating device for estimating the appearing-object or objects in the one unit video or in another unit video before or after the one unit video out of the plurality of unit videos, on the basis of the obtained statistical data.

2. The appearing-object estimating apparatus according to claim 1, further comprising an inputting device for urging input of data as for the appearing-object or objects which an audience desires to watch, said data obtaining device obtaining the statistical data on the basis of the inputted data as for the appearing-object or objects.

3. The appearing-object estimating apparatus according to claim 1, further comprising an identifying device for identifying the appearing-object or objects in the one unit video, on the basis of geometric features of the one unit video.

4. The appearing-object estimating apparatus according to claim 3, wherein said estimating device does not estimate the appearing-object or objects which are identified by said identifying device from among the appearing-object or objects in the one or another unit video, but estimates the appearing-object or objects which are not identified by said identifying device.

5. The appearing-object estimating apparatus according to claim 1, further comprising a meta data generating device for generating predetermined meta data which at least describes information as for the appearing-object or objects in the one unit video, on the basis of a result of estimation by said estimating device.

6. The appearing-object estimating apparatus according to claim 1, wherein said data obtaining device obtains probability data for representing such a probability that each of the appearing-object or objects appears in the video, as at least one portion of the statistical data.

7. The appearing-object estimating apparatus according to claim 1, wherein if one appearing-object of the appearing-object or objects appears in the unit video, said data obtaining device obtains probability data for representing such a probability that the one appearing-object continuously appears in M unit video or videos (M: natural number) continued from the unit video in which the one appearing-object appears, as at least one portion of the statistical data.

8. The appearing-object estimating apparatus according to claim 1, wherein if one appearing-object of the appearing-object or objects appears in the unit video, said data obtaining device obtains probability data for representing such a probability that N other appearing-object or objects (N: natural number) different from the one appearing-object appear in the unit video in which the one appearing-object appears as at least one portion of the statistical data.

9. The appearing-object estimating apparatus according to claim 1, wherein if one appearing-object of the appearing-object or objects appears in the unit video, said data obtaining device obtains probability data for representing such a probability that each of the appearing-object or objects other than the one appearing-object appears in the unit video in which the one appearing-object appears, as at least one portion of the statistical data.

10. The appearing-object estimating apparatus according to claim 1, wherein if one appearing-object of the appearing-object or objects and another appearing-object different from the one appearing-object of the appearing-object or objects appear in the unit video, said data obtaining device obtains probability data for representing such a probability that the one appearing-object and the another appearing-object continuously appear in L unit video or videos (L: natural number) continued from the unit video in which the one appearing-object and the another appearing-object appear, as at least one portion of the statistical data.

11. The appearing-object estimating apparatus according to claim 1, further comprising:

an audio information obtaining device for obtaining audio information corresponding to each of the one unit video and the another unit video; and a comparing device for mutually comparing the audio information corresponding to each of the unit videos, said data obtaining device obtaining probability data for representing such a probability that the one unit video and the another unit video are in a same situation, in association with a result of comparison by said comparing device, as at least one portion of the statistical data.

12. An appearing-object estimating method for estimating appearing-object or objects appearing in a recorded video, said appearing-object estimating method comprising:

a data obtaining process of obtaining one statistical data corresponding to an appearing-object or objects whose appearances are identified in advance in one unit video out of a plurality of unit videos into which the video is divided in accordance with predetermined types of criteria, out of the appearing-object or objects, from among a database including a plurality of statistical data, each having statistical properties as for the appearing-object or objects set in advance as for predetermined types of items; and an estimating process of estimating the appearing-object or objects in the one unit video or in another unit video before or after the one unit video out of the plurality of unit videos, on the basis of the obtained one statistical data.

13. A non-transitory computer-readable storage medium with a computer program stored thereon, executed by a computer system provided in the appearing-object estimating apparatus, to make the computer system function as an estimating device, said appearing-object estimating apparatus for estimating an appearing-object or objects appearing in a recorded video, said appearing-object estimating apparatus comprising:

a data-obtaining device for obtaining statistical data corresponding to an appearing-object or objects whose appearances are identified in advance in one unit video out of a plurality of unit videos into which the video is divided in accordance with predetermined types of criteria, out of the appearing-object or objects, from among a database including a plurality of statistical data, each having statistical properties as for the appearing-object or objects set in advance as for predetermined types of items, said estimating device for estimating the appearing-object or objects in the one unit video or in another unit video before or after the one unit video out of the plurality of unit videos, on the basis of the obtained statistical data.

* * * * *